United States Patent [19]

Hartmann

[11] 4,295,746

[45] Oct. 20, 1981

[54] ARRANGEMENT FOR FEEDING ELECTRODES IN METAL PAPER PRINTERS

[75] Inventor: Kurt Hartmann, Calw-Heumaden, Fed. Rep. of Germany

[73] Assignee: International Business Machines Corporation, Armonk, N.Y.

[21] Appl. No.: 143,691

[22] Filed: Apr. 25, 1980

[30] Foreign Application Priority Data

Sep. 4, 1979 [DE] Fed. Rep. of Germany ....... 2935595

[51] Int. Cl.³ .............................................. B41J 3/02
[52] U.S. Cl. ............................. 400/119; 219/137.61; 346/163
[58] Field of Search ....................... 400/118, 119, 121; 346/139 C, 162, 165, 155; 219/137.61; 128/303.13, 303.14, 303.17, 303.18

[56] References Cited

U.S. PATENT DOCUMENTS

| 2,733,118 | 1/1956 | Stamper | 346/139 C |
| 2,957,101 | 10/1960 | Barkley | 219/137.61 X |
| 3,249,734 | 5/1966 | Meyer | 219/137.61 |
| 3,369,254 | 2/1968 | Cohen | 346/139 C |
| 3,469,070 | 9/1969 | Bernard et al. | 219/137.61 X |
| 3,893,128 | 7/1975 | Bauerlen | 346/155 |
| 3,965,479 | 6/1976 | Sakamoto et al. | 346/139 C |
| 4,157,554 | 6/1979 | Bahr et al. | 346/139 C X |

FOREIGN PATENT DOCUMENTS

| 818870 | 2/1949 | Fed. Rep. of Germany ... | 346/139 C |
| 1448770 | 10/1968 | Fed. Rep. of Germany . | |
| 1403063 | 5/1965 | France . | |

OTHER PUBLICATIONS

*IBM Tech. Disc. Bulletin*, D. J. Bahr et al., vol. 22, No 11, Apr. 1980, p. 4969.

*IBM Tech. Disc. Bulletin*, H. Lutz et al., vol. 21, No. 7, Dec. 1978, p. 2871.

*IBM Tech. Disc. Bulletin*, K. Hartmann, vol. 21, No 7, Dec. 1978, p. 2873.

*Primary Examiner*—P. T. Sewell
*Attorney, Agent, or Firm*—Kenneth P. Johnson

[57] ABSTRACT

Two electrodes are arranged within an insulating tube to have longitudinal contact with each other. One of the electrode wires is connected to a voltage source and the other can be pulled out of the insulating tube as it is consumed, as for electrode feeding in metal paper printers.

4 Claims, 3 Drawing Figures

ARRANGEMENT FOR FEEDING ELECTRODES IN METAL PAPER PRINTERS

BACKGROUND OF THE INVENTION

The invention concerns an arrangement for advancing electrodes as they wear in metal paper printers. This wear is particularly high in printers with a high print resolution, i.e., with very thin electrodes. For this reason the electrodes have to be refed.

German Offenlegungsschrift No. 2 758 150 teaches an arrangement for feeding electrodes for multiple electrode print heads of metal paper printers which is characterized in that a hollow drum moving in a housing is provided, that the housing bore for accommodating the drum or the drum circumference is provided with parallel grooves for accommodating the electrodes, that the electrodes are led through the interior of the drum through bores, being connected to a contact plug, that the electrodes extending in the grooves of the housing bore or the drum tangentially leave said bore or drum and can be fed to the electrode guides of the print head, and that a drive for rotating the drum in steps is provided.

This arrangement is an elaborate design. It not only requires a relatively great amount of space but also has a relatively high weight which adversely affects the speed control of the print head.

SUMMARY OF THE INVENTION

Therefore, it is the object of the invention to provide an arrangement for feeding electrodes in metal paper printers, which has a simple design, requires little space and has low weight.

In accordance with the foregoing object of the invention provides an insulative, flexible tube enclosing a pair of electrodes held in frictional contact along portions of their sides. The two electrodes extend from opposite ends of the tube, one being connected to a source of voltage and the other arranged to be pulled from the tube and placed in contact with metallized paper. Electrodes assembled in this fashion obviate the disadvantage of frequent replacement since adequate reverse electrode length can be supplied within the assembly.

The foregoing and other objects, features and advantages of the invention will be apparent from the following more particular description of a preferred embodiment of the invention, as illustrated in the accompanying drawing.

Figure 1:
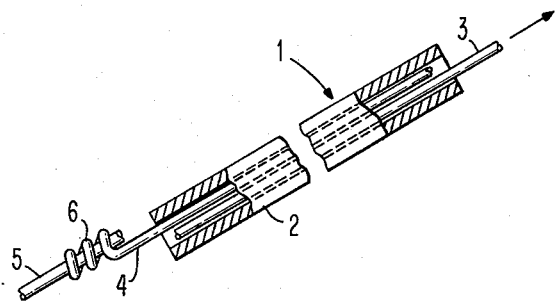
FIG. 1 is a schematic representation of a flexible thin tube with two juxtaposed electrode wires contacting each other along their sides.

A thin flexible tube 2 of non-conducting material is schematically shown in FIG. 1 and is preferably made of plastic. In tube 2, two electrode wires 4 and 3 are arranged. The protruding end of electrode wire 4 is connected to a voltage supply 5. Such connection may take the form of what is known, for example, as a "wire wrap" connection (wire strand) and be surrounded by a plastic shrink-on tubing (not shown). The electrode wire 3 is movable in tube 2 in the arrow-marked direction. The diameter of the electrode wires used for high resolution metal paper printers is of the order of 80μ. As a result of this small diameter, the electrode wires are relatively flexible. The internal diameter of the tube 2 is such that the two electrode wires (4 and 3) can be readily accommodated. As the electrode wires touch each other on their longitudinal sides, care must be taken that there is adequate electrical contact. In addition, the tube diameter must be adapted to the two electrode wires in such a manner that the movably arranged electrode wire 3 is slightly shiftable relative to the electrode wire 4. The movably arranged electrode wire must continue to be shiftable even when the electrode tube 2 is elastically bent. At the same time good mutual electric contact must be ensured. For feeding the electrode wire 3, to compensate for the wear occurring during printing, the wire is pulled out of the tube 2 by means of an arrangement not shown, but for example, could be with the aid of transport rollers. The total length of the electrodes wire 3 must be chosen in such a manner that worn electrodes wires 3 need to be replaced infrequently.

Tests have shown that if the electrode tube 2 or the electrode wire 3 to be used are of adequate length, replacement of the electrode is no longer a problem, since its life exceeds the service life of the entire printer. However, insertion of a new electrode 3 would pose no problems.

Figure 2:
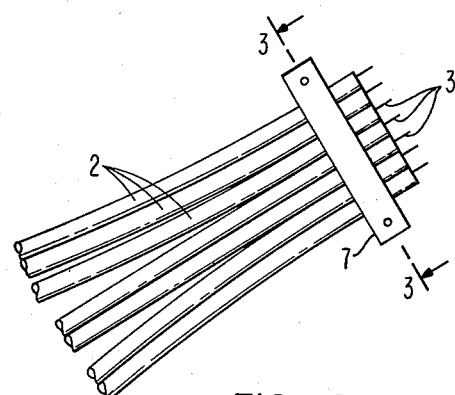
FIG. 2 is a schematic representation of a bundle of electrode carrying tubes with guide means for said bundle.
Figure 3:
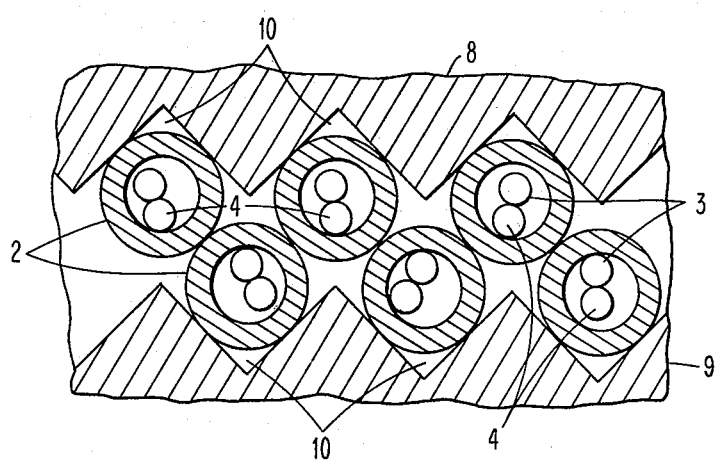
FIG. 3 is a schematic sectional view of the guide means of FIG. 2 along line 3—3.

FIGS. 2 and 3 show guide means 7 for a bundle of tubes with electrode wires. Said means 7 consist of two halves: one lower part 9 and one upper part 8. In the upper and the lower part adjacent parallel grooves 10 are provided for accommodating a part of electrode tubes 2 with wires. These grooves preferably have a triangular cross-section. The grooves of upper part 8 are staggered by half the groove width relative to those of lower part 9. The groove depth is less than the tube diameter, so that at a corresponding spacing of the upper and the lower part, the electrode tubes of the lower part are arranged partly between the tubes of the upper part. Such an arrangement ensures that electrodes 3 protruding from individual tubes 2 are arranged at a short spacing from each other and are located approximately in one plane. This is essential when the electrodes 3 are fed to a transport roller arrangement, not shown, for advancing the electrodes. For design reasons, such advance means often lead to the electrodes being positioned in one plane. Thus, the guide piece 7, in addition to fixing the individual electrode tubes, causes the position of the tubes to be transformed. This is essential for high resolution metal paper printers, in order to obtain a high packing density of the electrodes and to align them approximately in one plane. Alignment is assisted by the fact that the exit of the electrodes 3 from the individual electrode tube 1 automatically occurs along a horizontal line.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for holding a pair of electrodes while allowing the advancement of one electrode with respect to the other comprising:

a plurality of first and second elongate electrodes;

a flexible tube surrounding each pair of a first and a second electrode for holding said pair of electrodes in contacting juxtaposition along at least a portion of their length, said tube being an electrically insulative material; and guide means having a plurality of grooves therein with each groove adapted to receive one of said tubes and being of a depth less than the diameter of a said tube.

2. Apparatus as described in claim 1 wherein said guide means includes a pair of opposing grooved elements with the grooves in one element laterally offset with respect to the grooves in the opposing element.

3. Apparatus as described in claim 2 wherein the grooves in each of said elements are parallel to the grooves in the opposing element.

4. Apparatus for allowing the withdrawal of one of a pair of contacting electrodes with respect to the other comprising:

at least one first and one second elongate electrode;

a flexible tube surrounding said electrodes for holding said electrodes in contacting juxtaposition, said tube being of an electrically insulative material; and guide means having at least one groove therein adapted to receive a said tube, said groove being a depth less than the diameter of a said tube.

* * * * *